(12) United States Patent
Cho et al.

(10) Patent No.: US 8,985,789 B2
(45) Date of Patent: Mar. 24, 2015

(54) IMAGING LENS CAPABLE OF BLOCKING STRAY LIGHT

(71) Applicant: Genius Electronic Optical Co., Ltd., Taichung (TW)

(72) Inventors: Hung-Chang Cho, Taichung (TW); Yi-Man Deng, Taichung (TW); Ling-Hui Xue, Taichung (TW)

(73) Assignee: Genius Electronic Optical Co., Ltd. (TW)

( * ) Notice: Subject to any disclaimer, the term of this patent is extended or adjusted under 35 U.S.C. 154(b) by 166 days.

(21) Appl. No.: 13/908,111

(22) Filed: Jun. 3, 2013

(65) Prior Publication Data

US 2014/0160581 A1    Jun. 12, 2014

(30) Foreign Application Priority Data

Dec. 6, 2012    (CN) .......................... 2012 1 0518752

(51) Int. Cl.
| | |
|---|---|
| *G03B 11/04* | (2006.01) |
| *G02B 13/00* | (2006.01) |
| *G02B 27/00* | (2006.01) |
| *G02B 7/02* | (2006.01) |

(52) U.S. Cl.
CPC ........ *G02B 27/0018* (2013.01); *G02B 13/0035* (2013.01); *G02B 7/02* (2013.01)
USPC .......................... 359/611; 359/601; 359/740

(58) Field of Classification Search
CPC ......................................................... G02B 7/10
USPC ......................................................... 359/611
See application file for complete search history.

(56) References Cited

U.S. PATENT DOCUMENTS

| | | | |
|---|---|---|---|
| 8,320,059 B2 * | 11/2012 | Lin | 359/740 |
| 2013/0063822 A1 * | 3/2013 | Lin | 359/601 |

* cited by examiner

*Primary Examiner* — Suchin Parihar
*Assistant Examiner* — Daniel Kassaye
(74) *Attorney, Agent, or Firm* — Baker & McKenzie LLP

(57) ABSTRACT

An imaging lens includes a lens barrel, an imaging unit and a light shielding unit. The lens barrel includes a base wall formed with a light incident hole at an optical axis of the imaging lens and a surrounding wall that extends from and cooperates with the base wall to define a receiving space. The imaging unit includes a plurality of imaging components each having an annular front contact surface and an annular back contact surface. The light shielding unit includes an annular retaining portion clamped between an adjacent pair of the imaging components, an object-side protruding portion with a first edge, and an image-side protruding portion with a second edge.

10 Claims, 10 Drawing Sheets

IMAGING LENS CAPABLE OF BLOCKING STRAY LIGHT

CROSS-REFERENCE TO RELATED APPLICATION

This application claims priority of Chinese application no. 201210518752.8, filed on Dec. 6, 2012, the contents of which are hereby incorporated by reference in their entirety for all purposes.

BACKGROUND OF THE INVENTION

1. Field of the Invention

The present invention relates to an imaging lens capable of blocking stray light.

2. Description of the Related Art

Referring to FIG. 1, a conventional imaging lens includes a lens barrel 11, lens components 121-124 disposed in the lens barrel 11 along an optical axis 10, two light shielding components 125, 126 disposed between the lens components 121, 122, and between the lens components 123, 124, respectively, and a washer 127 clamped between the light shielding component 126 and the lens component 124. The light shielding components 125, 126 are disposed to block stray light for preventing degradation of image quality. The washer 127 serves to reduce the thickness of a mounting portion of the lens component 124 that is to be assembled with the lens component 123, effectively aiding the manufacturing of the lens component 124.

However, the conventional light shielding components 125, 126 do not effectively block stray light at large incident angles. As shown in FIG. 1, stray light 110 can still arrive at an imaging plane 128 after reflection and refraction among the lens components 121~124 in the lens barrel 11, resulting in adverse effect on image quality. Therefore, it is required to provide an imaging lens that may effectively block most of stray light for promoting image quality.

Furthermore, if the contacting surfaces between the lens components 121~124 and the conventional light shielding components 125, 126 are uneven due to manufacturing tolerances, spaces will form between adjacent contacting surfaces. This causes the conventional light shielding components 125, 126 which are extremely thin to deform easily and to be difficult to be attached evenly to the lens components 121~124. Such drawbacks affect the precision in the assembly of the conventional imaging lens, adversely affecting the light shielding effect and the image quality. Therefore, such conventional imaging lens has components that are difficult to manufacture, a large number of components that affects precision in assembly, and the image quality problems due to the adverse effect on precision in assembly.

SUMMARY OF THE INVENTION

The object of the present invention is to provide an imaging lens that is capable of blocking stray light and alleviating at least one of the aforesaid drawbacks of the prior art.

Accordingly, the imaging lens of this invention comprises:

a lens barrel including a base wall formed with a light incident hole at an optical axis (I) of the imaging lens and disposed proximate to an object side (A), and a surrounding wall that extends from an outer periphery of the base wall toward an image side (B), and that cooperates with the base wall to define a receiving space;

an imaging unit disposed in the receiving space of the lens barrel, and including a plurality of imaging components arranged along the optical axis (I) in an order, each of the imaging components having an annular front contact surface facing toward the object side (A) and an annular back contact surface facing toward the image side (B); and a light shielding unit disposed in between an adjacent pair of the imaging components and clamped between the annular back contact surface of one of the imaging components in the adjacent pair and the annular front contact surface of the other one of the imaging components in the adjacent pair, the light shielding unit including an annular retaining portion clamped between the adjacent pair of the imaging components, an object-side protruding portion slantingly extending from an object-side inner peripheral edge of the retaining portion towards the optical axis and terminating at a first edge, and an image-side protruding portion slantingly extending from an image-side inner peripheral edge of the retaining portion towards the optical axis and terminating at a second edge.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
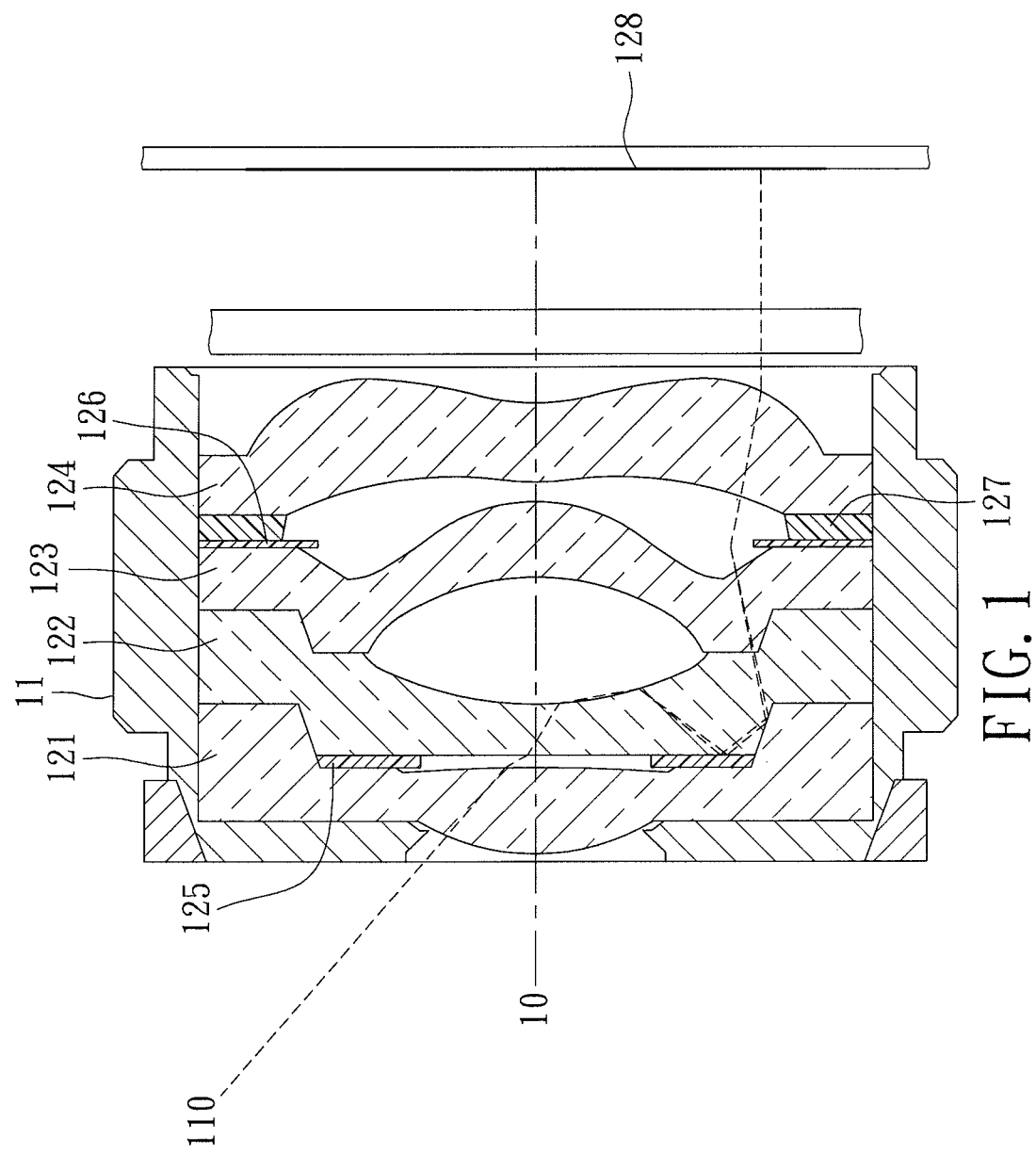
FIG. 1 is a cross-sectional view of a conventional imaging lens.

Before the present invention is described in greater detail, it should be noted that like elements are denoted by the same reference numerals throughout the disclosure.

Figure 2:
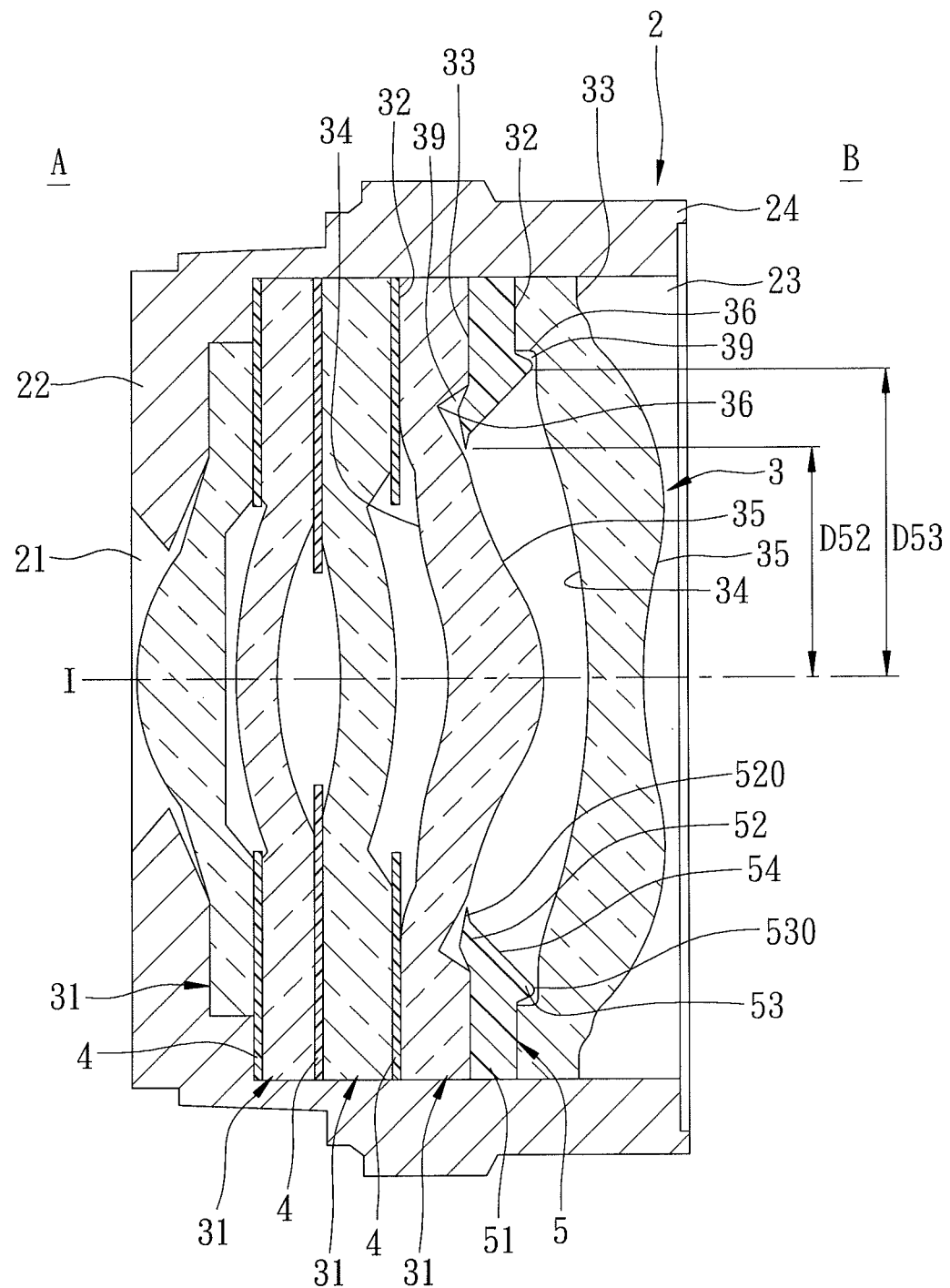
FIG. 2 is a cross sectional view of an imaging lens capable of blocking stray light according to the first embodiment of the present invention.
Figure 3:
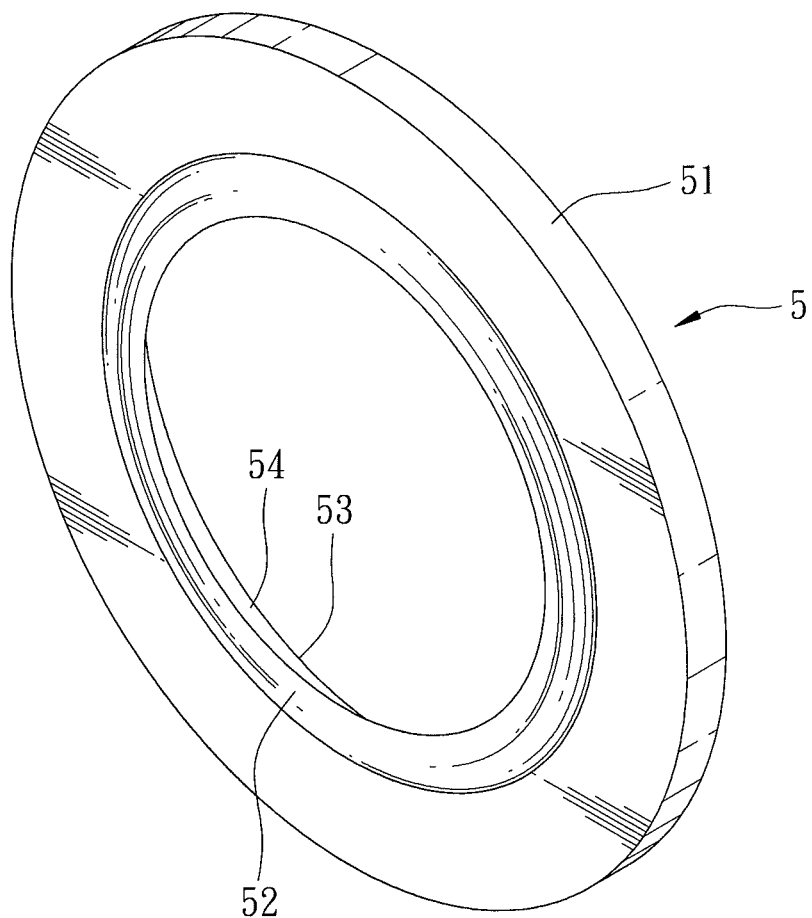
FIG. 3 is a perspective view illustrating a light shielding unit according to the first embodiment of the present invention.
Figure 4:
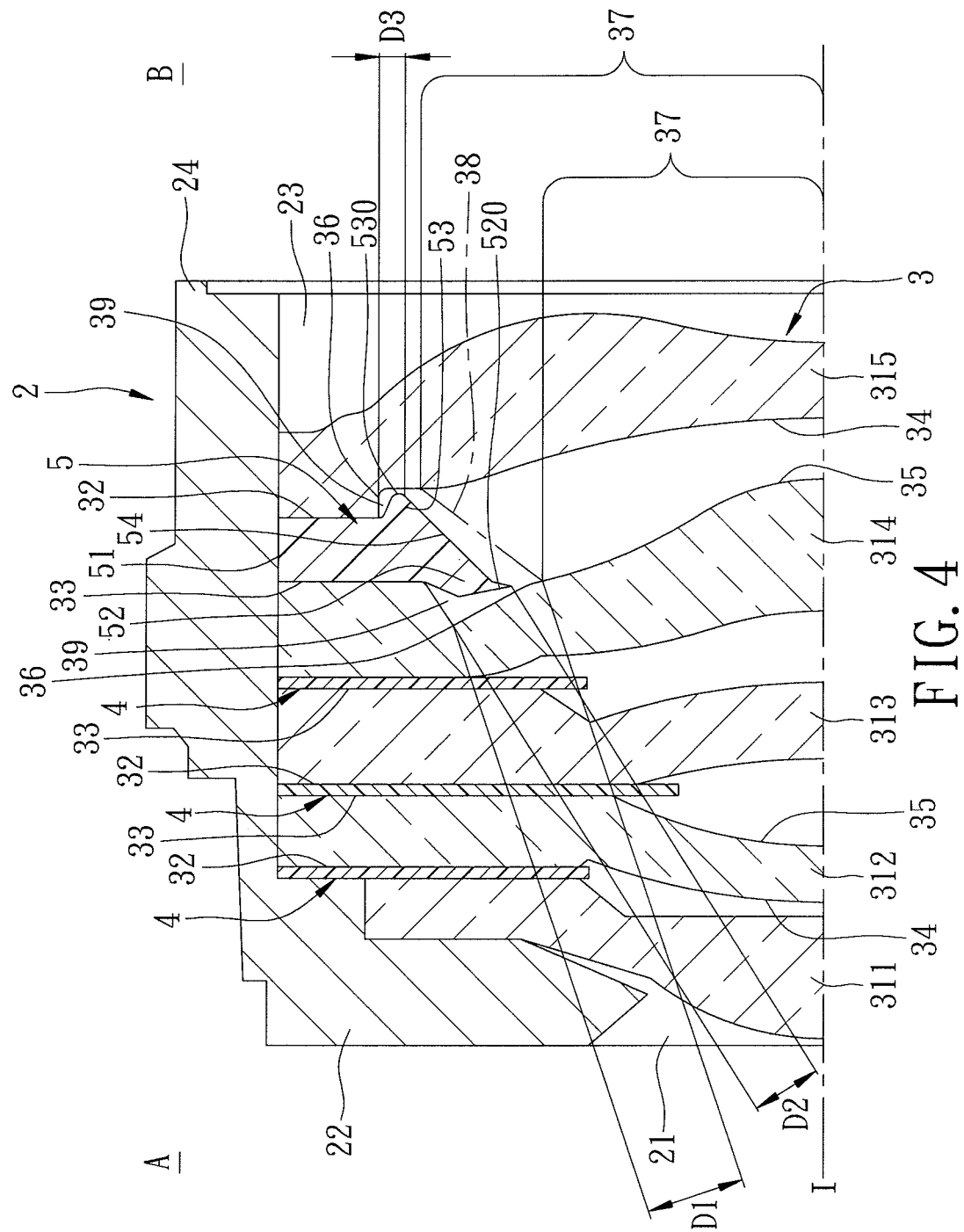
FIG. 4 is a fragmentary cross sectional view of the first embodiment.

Referring to FIGS. 2, 3 and 4, a first preferred embodiment of the imaging lens 2 according to this invention is shown to include a lens barrel 2, an imaging unit 3 disposed in the lens barrel 2, a plurality of light shielding plates 4, and a light shielding unit 5.

The lens barrel 2 includes a base wall 22 formed with a light incident hole 21 at an optical axis (I) of the imaging lens 2 and disposed proximate to an object side (A), and a surrounding wall 24 that extends from an outer periphery of the base wall 22 toward an image side (B), and that cooperates with the base wall 22 to define a receiving space 23.

The imaging unit 3 is disposed in the receiving space 23 of the lens barrel 2, and includes a plurality of imaging components 31 arranged along the optical axis (I). Each of the imaging components 31 has an annular front contact surface 32 facing toward the object side (A), an annular back contact surface 33 facing toward the image side (B), a curved object-side surface 34 surrounded by the front contact surface 32, and a curved image-side surface 35 surrounded by the back contact surface 33. Each of the curved object-side surface 34 and the curved image-side surface 35 is surrounded by a respective periphery 36, and has a respective optical effective diameter area 37 for passage of light for imaging.

An adjacent pair of imaging components 31 forms an imaging light boundary 38, which is defined to extend from a boundary of the optical effective diameter area 37 of the curved image-side surface 35 of one of the imaging components 31 in the adjacent pair that is closer to the object side (A), to a boundary of the optical effective diameter area 37 of the curved object-side surface 34 of the other one of the imaging components 31 in the adjacent pair that is closer to the image side (B).

The optical effective diameter area 37 refers to the area of the curved object-side surface 34 or the curved image-side surface 35 with the diameter effective for passage of imaging light. In designing the imaging lens, a distance (D1) between the boundary of the optical effective diameter area 37 of the curved object-side surface 34 or the curved image-side surface 35 and the periphery 36 of the curved object-side surface 34 or the curved image-side surface 35 is usually set to be in the range of from 0.1 mm to 0.5 mm. FIG. 4 is a sectional view illustrating an upper half portion of FIG. 2, and therefore only illustrates the upper half of the optical effective diameter area 37.

In this embodiment, the imaging unit 3 includes first, second, third, fourth and fifth imaging components 311-315 arranged along the optical axis (I) in the given order from the object side (A) to the image side (B). It should be noted that the number of the imaging components 31 of the imaging unit 3 is not limited thereto and may vary depending on design requirements. Although the respective optical effective diameter area 37 and the periphery 36 are illustrated for the curved image-side surface 35 of the fourth imaging component 314 and the curved object-side surface 34 of the fifth imaging component 315, it should be clear that each of the curved object-side surfaces 34 and the curved image-side surfaces 35 of the imaging components 311-315 has a respective optical effective diameter area 37 and periphery 36.

Each of the light shielding plates 4 is an annular and opaque thin plate having a thickness of about 0.02 mm. The light shielding plates 4 are respectively clamped between the annular back contact surface 33 of the imaging component 311 and the annular front contact surface 32 of the imaging component 312, between the annular back contact surface 33 of the imaging component 312 and the annular front contact surface 32 of the imaging component 313, and between the annular back contact surface 33 of the imaging component 313 and the annular front contact surface 32 of the imaging component 314.

The light shielding unit 5 is disposed between an adjacent pair of the imaging components 31 and is clamped between the annular back contact surface 33 of one of the imaging components 31 in the adjacent pair and the annular front contact surface 32 of the other one of the imaging components 31 in the adjacent pair. In this preferred embodiment, the light shielding unit 5 is disposed between an adjacent pair of the imaging components 314, 315 and is clamped between the annular back contact surface 33 of the imaging component 314 and the annular front contact surface 32 of the imaging component 315. It is understood that the light shielding unit 5 may be disposed between any adjacent pair of the imaging components 31 based on design requirements.

The light shielding unit 5 is formed by plastic injection molding, and the surfaces of which are delustered to prevent reflection of light. The light shielding unit 5 includes an annular retaining portion 51 clamped between an adjacent pair of the imaging components 31, an object-side protruding portion 52 slantingly extending from an object-side inner peripheral edge of the retaining portion 51 towards the optical axis (I) and terminating at a first edge 520, an image-side protruding portion 53 slantingly extending from an image-side inner peripheral edge of the retaining portion 51 towards the optical axis (I) and terminating at a second edge 530, and a surface 54 that is defined between the first edge 520 of the object-side protruding portion 52 and the second edge 530 of the image-side protruding portion 53 and that is entirely disposed outside a space bounded by the imaging light boundary 38, i.e., the surfaces 54 does not extend into the space bounded by the imaging light boundary 38. The surface 54 is a flat surface in this embodiment.

Each of the fourth imaging component 314 and the fifth imaging component 315 is formed with an annular groove 39 to accommodate a respective one of the object-side protruding portion 52 and the image-side protruding portion 53.

In this preferred embodiment, the thickness of the retaining portion 51 is 0.3 mm and the shape of the retaining portion 51 corresponds with those of the annular front contact surface 32 of the fifth imaging component 315 and the annular back contact surface 33 of the fourth imaging component 314. The shape of the retaining portion 51 is a flat shape in this embodiment.

The object-side protruding portion 52 is formed with a plurality of curved surface parts and is shaped to correspond with the annular groove 39 of the fourth imaging component 314, enabling the object-side protruding portion 52 to be in a position that is closer to the fourth imaging component 314 to block the passage of stray light. A distance (D2) between the first edge 520 of the object-side protruding portion 52 and the periphery 36 of the curved image-side surface 35 of the fourth imaging component 314 ranges between 0.1 mm and 0.5 mm.

Similarly, the image-side protruding portion 53 is formed with a plurality of curved surface parts and is shaped to correspond with the annular groove 39 of the fifth imaging component 315. A distance (D3) between the second edge 530 of the image-side protruding portion 53 and the periphery 36 of the curved object-side surface 34 of the fifth imaging component 315 ranges between 0.1 mm and 0.5 mm.

The above-mentioned ranges for (D2) and (D3) are found through experimentation. If D2 or D3 is smaller than 0.1 mm, then the first edge 520 or the second edge 530 may come into contact with the fourth imaging component 314 or the fifth imaging component 315, due to manufacturing tolerance. Such contact affects the amount of the light that may pass and the luminance of the image thus formed. On the other hand, if D2 or D3 is larger than 0.5 mm, the stray light blocking effect will be reduced, affecting the image quality.

Referring to FIGS. 2 and 4, the perpendicular distance D52 between the first edge 520 of the object-side protruding portion 52 and the optical axis (I) is smaller than the perpendicular distance D53 between the second edge 530 of the image-side protruding portion 53 and the optical axis (I). In this embodiment, the first edge 520 is designed to be a pointed edge. In other embodiments, the second edge 530 may also be designed to be pointed, or the first edge 520 and the second edge 530 may both be designed to be pointed.

The imaging lens of the present invention has the following advantages:

1. The light shielding unit 5, having a retaining portion 51 of a certain thickness, can act as a conventional washer and therefore enables the thicknesses at the annular front contact surface 32 and the annular back contact surface 33 to be reduced, effectively reducing the thickness and increasing the manufacturability of the imaging components 31.
2. The light shielding unit 5 is formed by plastic injection molding, and the annular retaining portion 51, the object-side protruding portion 52 and the image-side protruding portion 53 can therefore correspond to the shapes of the adjacent fourth imaging component 314 and the fifth imaging component 315. The injection-molded light shielding unit 5 has a high dimension accuracy, such that the effect of blocking stray light and the passage of image light will not be affected due to manufacturing tolerance.
3. The light shielding unit 5 including the annular retaining portion 51, the object-side protruding portion 52 and the image-side protruding portion 53 acts as both a conventional washer 127 and a light shielding component. Therefore, the number of components in an imaging lens can be reduced, and the precision in assembling the imaging lens can be increased, thereby improving the image quality.
4. By designing the first edge 520 and the second edge 530 to be pointed, and delustering the surfaces of the light shielding unit 5, the reflection of the stray light can be effectively reduced, thus improving the image quality.

Figure 5:
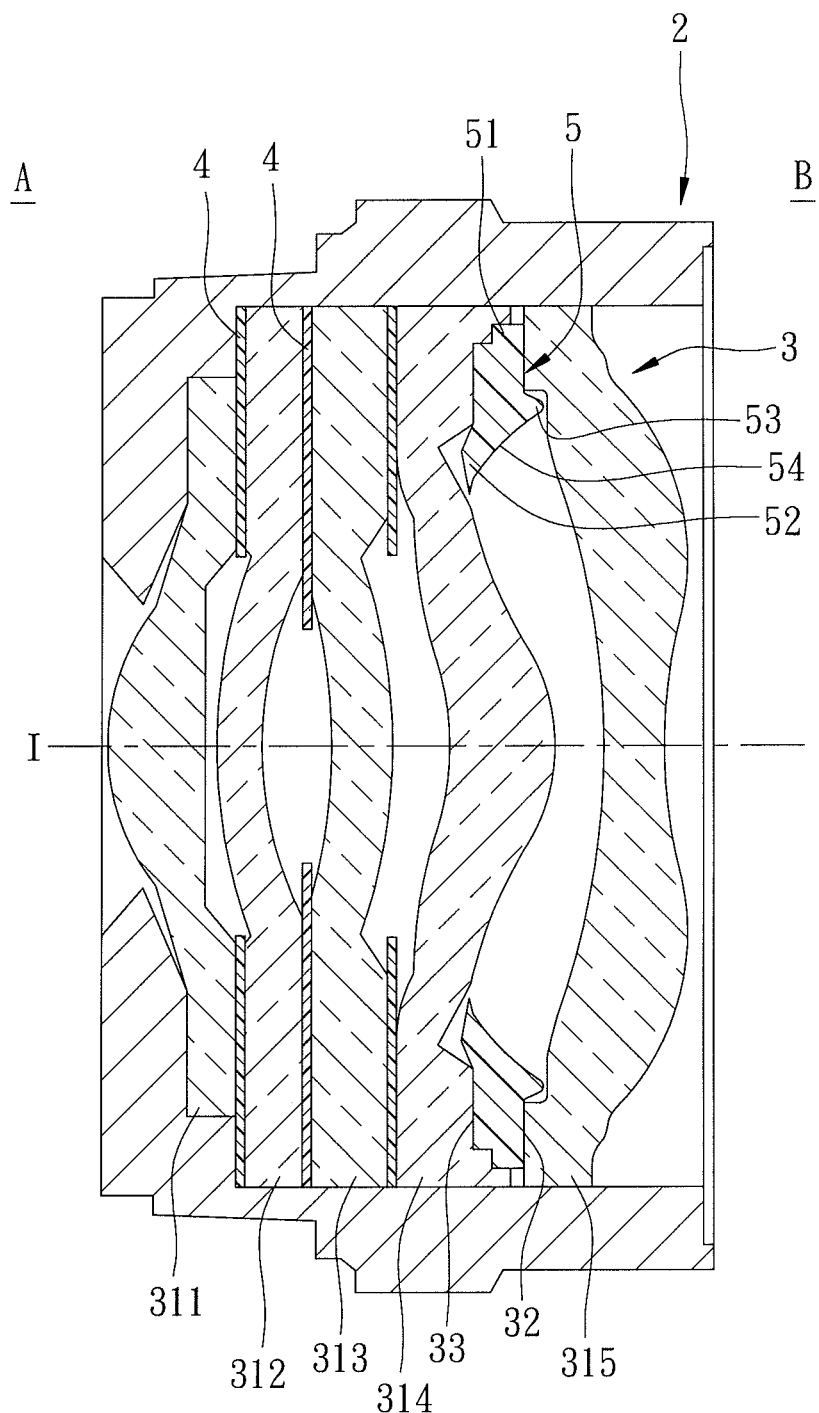
FIG. 5 is a cross-sectional view of an imaging lens capable of blocking stray light according to the second embodiment of the present invention.

Referring to FIG. 5, the second preferred embodiment of the imaging lens of the present invention differs from the first preferred embodiment in that, the annular retaining portion 51 has a stepped shape to correspond with the shapes of the annular front contact surface 32 of the adjacent fifth imaging component 315 and the annular back contact surface 33 of the adjacent fourth imaging component 314. In addition, the surface 54 is a concave surface.

Figure 6:
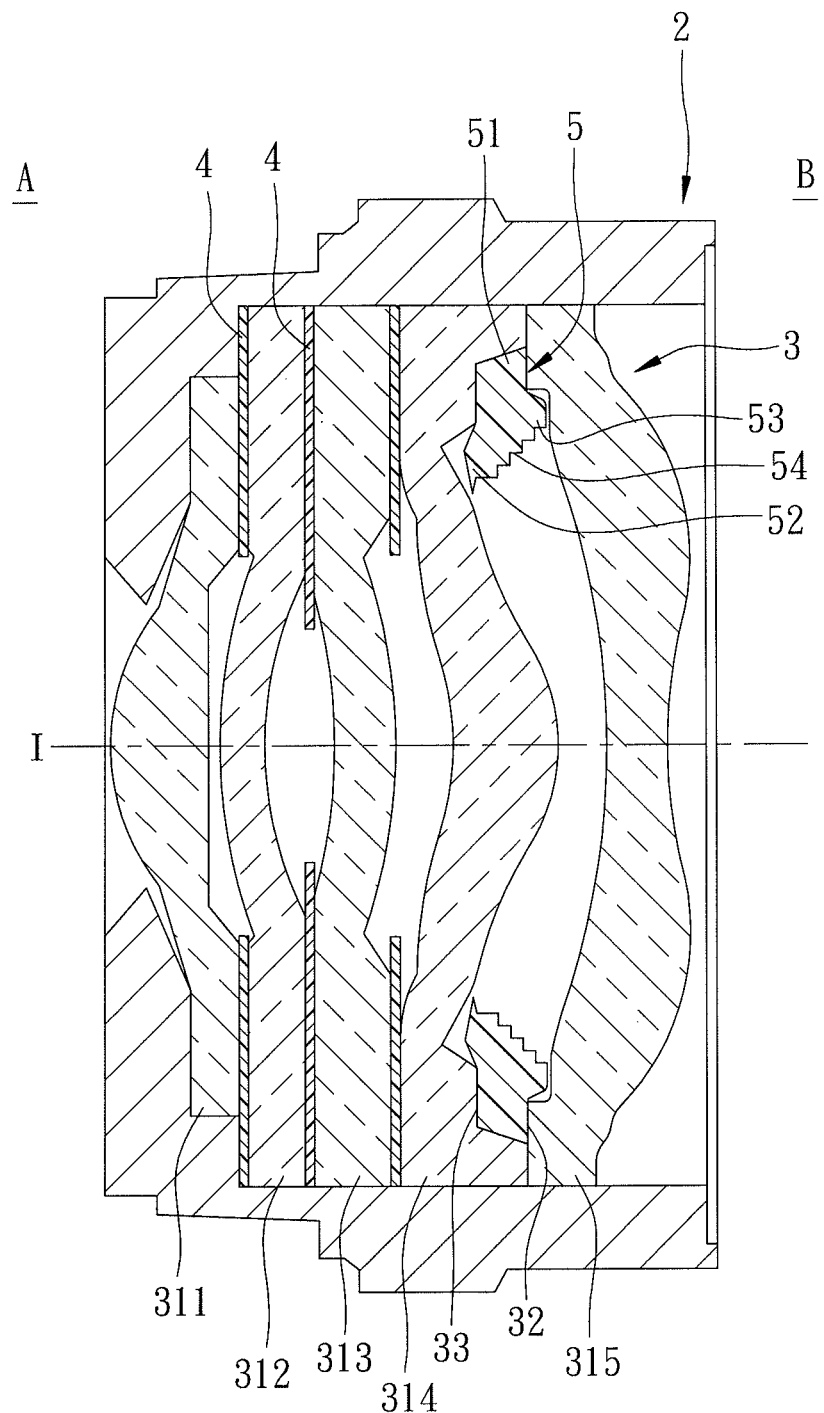
FIG. 6 is a cross-sectional view of an imaging lens capable of blocking stray light according to the third embodiment of the present invention.

Referring to FIG. 6, the third preferred embodiment of the imaging lens of the present invention differs from the first preferred embodiment in that, the annular retaining portion 51 has a wedge shape to correspond with the shapes of the annular front contact surface 32 of the adjacent fifth imaging component 315 and the annular back contact surface 33 of the adjacent fourth imaging component 314. In addition, the surface 54 is a stepped surface.

Figure 7:
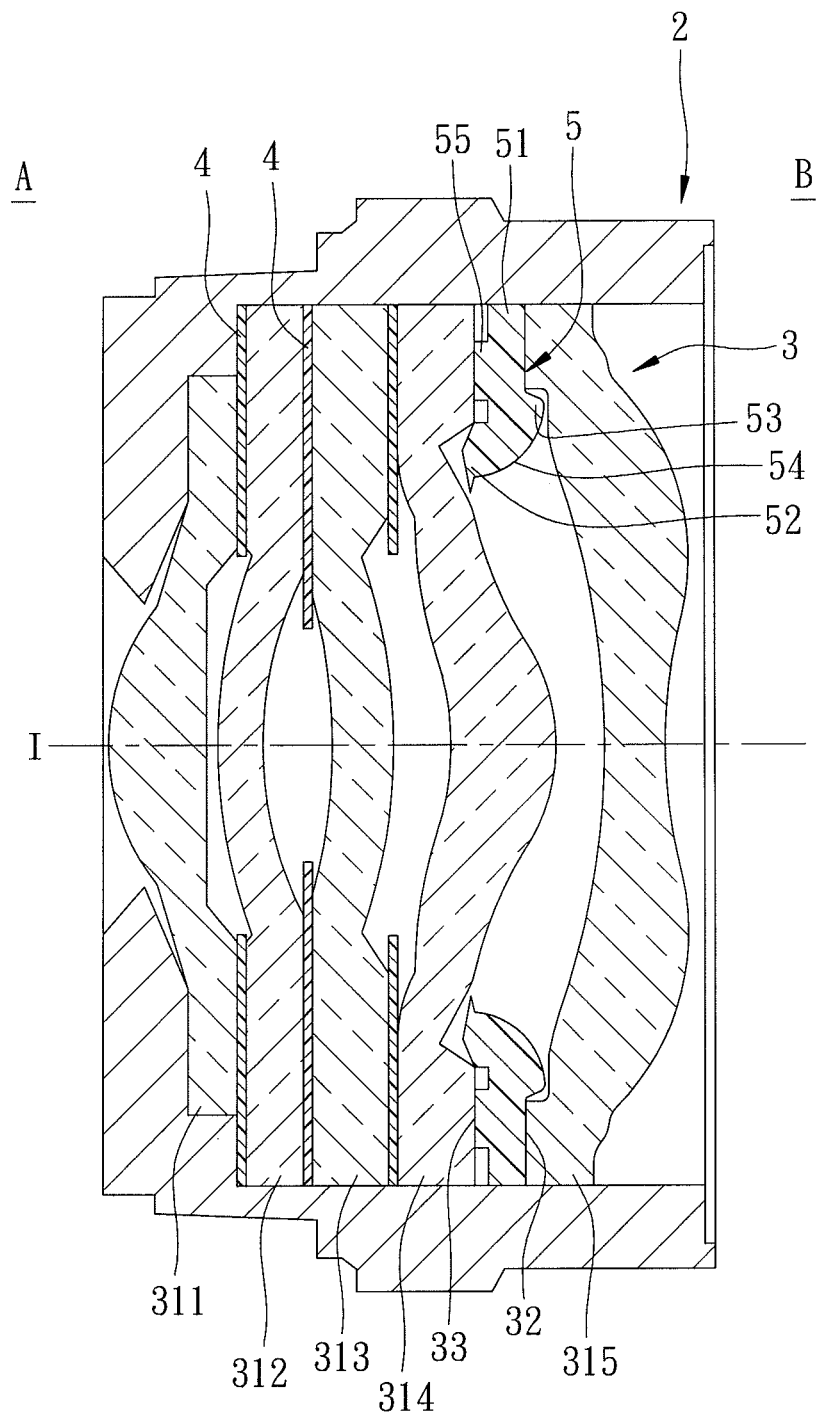
FIG. 7 is a cross-sectional view of an imaging lens capable of blocking stray light according to the fourth embodiment of the present invention.
Figure 8:
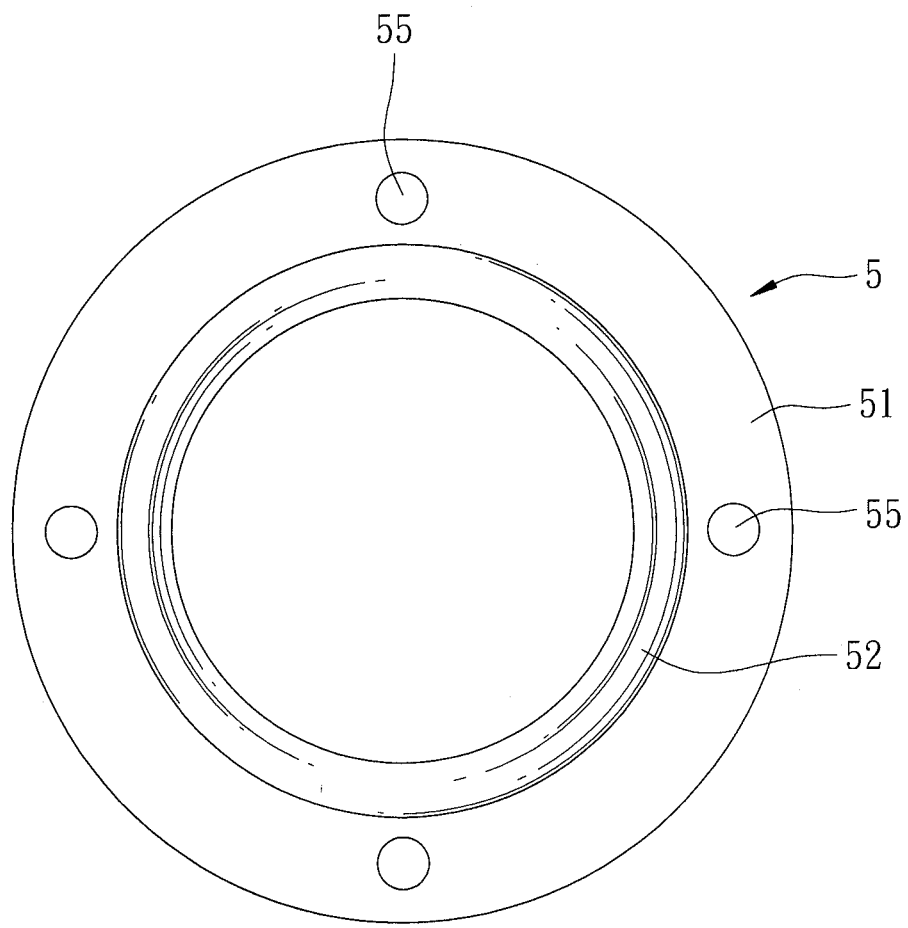
FIG. 8 is a schematic view of a light shielding unit according to the fourth embodiment of the present invention.

Referring to FIGS. 7 and 8, the fourth preferred embodiment of the imaging lens of the present invention differs from the first preferred embodiment in that, the surface 54 is a convex surface. The light shielding unit 5 further includes a plurality of protrusions 55 disposed spacedly on the retaining portion 51 and disposed to abut against one of the annular front contact surface 32 and the annular back contact surface 33 that are adjacent to the retaining portion 51. In this preferred embodiment, the protrusions 55 abut against the annular back contact surface 33 of the fourth imaging component 314.

Figure 9:
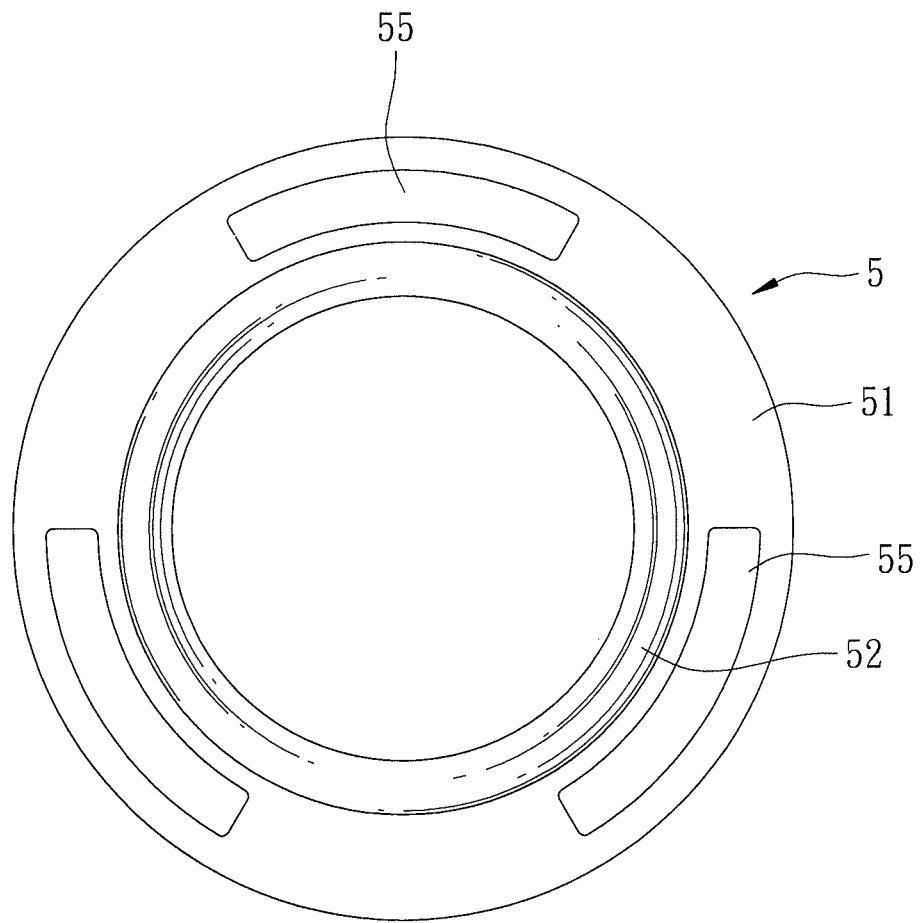
FIG. 9 is a schematic view of a modified light shielding unit according to the fourth embodiment of the present invention.
Figure 10:
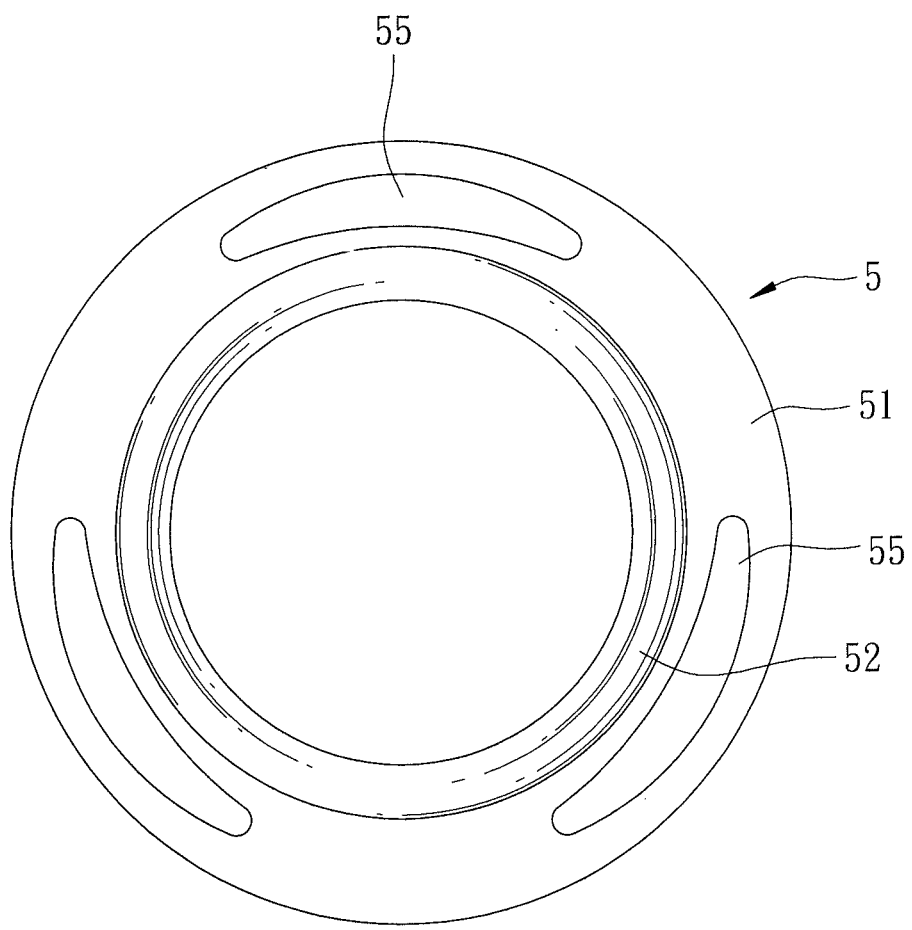
FIG. 10 is a schematic view of another modified light shielding unit according to the fourth embodiment of the present invention.

The protrusions 55 compensate for unevenness of the thickness of the retaining portion 51. The unevenness of the thickness of the retaining portion 51 might result from its manufacturing, and the unevenness in thickness affects the precision of assembly of the imaging lens. Therefore, the protrusions 55 in the fourth embodiment, in contrast to the first embodiment, further provide compensation for the unevenness in the thickness of the retaining portion 51, reducing time spent on making the thickness even during manufacturing by partially regulating the thickness of the protrusions 55. The number and shape of the protrusions 55 can be modified according to design needs. Referring to FIGS. 8, 9, and 10, the shape of the protrusions 55 can be cylindrical as illustrated in FIG. 8, arc-shaped as illustrated in FIG. 9, or irregular as illustrated in FIG. 10.

In summary, the light shielding unit 5 can be assembled with an imaging unit 3 and a lens barrel 2 of different types of structure and configuration into an imaging lens of the present invention for that is capable of blocking light. The above-mentioned embodiments of the present invention demonstrate that the light shielding unit 5 is stabilized through the retaining portion 51 and can act as washer at the same time, reducing the number of components in the imaging lens and thus achieving a higher precision in the assembly. By virtue of the object-side protruding portion 52 and the image-side protruding portion 53, the stray light can be effectively blocked. The shape of the light shielding unit 5 corresponds with the shapes of the adjacent pair of imaging components 31 such that they can be assembled with ease, providing a better imaging quality through the blocking of stray light.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:
1. An imaging lens comprising:
a lens barrel including a base wall formed with a light incident hole at an optical axis of the imaging lens and disposed proximate to an object side, and a surrounding wall that extends from an outer periphery of the base wall toward an image side, and that cooperates with the base wall to define a receiving space;
an imaging unit disposed in the receiving space of the lens barrel, and including a plurality of imaging components arranged along the optical axis in an order, each of the imaging components having an annular front contact surface facing toward the object side and an annular back contact surface facing toward the image side; and
a light shielding unit disposed in between an adjacent pair of the imaging components and clamped between the annular back contact surface of one of the imaging components in the adjacent pair and the annular front contact surface of the other one of the imaging components in the adjacent pair, the light shielding unit including an annular retaining portion clamped between the adjacent pair of the imaging components, an object-side protruding portion slantingly extending from an object-side inner peripheral edge of the retaining portion towards the optical axis and terminating at a first edge, and an image-side protruding portion slantingly extending from an image-side inner peripheral edge of the retaining portion towards the optical axis and terminating at a second edge.

2. The imaging lens as claimed in claim 1, wherein each of the imaging components further has a curved object-side surface surrounded by the front contact surface thereof and a curved image-side surface surrounded by the back contact surface thereof; and
wherein each of the curved object-side surface and the curved image-side surface is surrounded by a respective periphery, and has a respective optical effective diameter area for passage of light for imaging.

3. The imaging lens as claimed in claim 2, wherein a distance between the first edge of the object-side protruding portion and the periphery of the curved image-side surface of one of the imaging components in the adjacent pair that is closer to the object side ranges between 0.1 mm and 0.5 mm; and wherein a distance between the second edge of the image-side protruding portion and the periphery of the curved object-side surface of the other one of the imaging components in the adjacent pair that is closer to the image side ranges between 0.1 mm and 0.5 mm.

4. The imaging lens as claimed in claim 2, wherein an imaging light boundary is defined to extend from a boundary of the optical effective diameter area of the curved image-side surface of one of the imaging components in the adjacent pair that is closer to the object side, to a boundary of the optical effective diameter area of the curved object-side surface of the other one of the imaging components in the adjacent pair that is closer to the image side; and wherein the light shielding unit further includes a surface defined between the first edge of the object-side protruding portion and the second edge of the image-side protruding portion, the surface being entirely disposed outside a space bounded by the imaging light boundary.

5. The imaging lens as claimed in claim 1, wherein at least one of the object-side protruding portion and the image-side protruding portion is formed with a plurality of curved surface parts.

6. The imaging lens as claimed in claim 5, wherein each of the imaging components in the adjacent pair is formed with an annular groove to accommodate a respective one of the object-side protruding portion and the image-side protruding portion.

7. The imaging lens as claimed in claim 1, wherein the retaining portion has a shape corresponding to those of the annular front contact surface and the annular back contact surface that are adjacent to the retaining portion, the shape of the retaining portion being one of a flat shape, a wedge shape and a stepped shape.

8. The imaging lens as claimed in claim 1, wherein at least one of the first edge and the second edge is a pointed edge.

9. The imaging lens as claimed in claim 1, wherein a distance between the first edge and the optical axis is smaller than a distance between the second edge and the optical axis.

10. The imaging lens as claimed in claim 1, wherein the light shielding unit further includes a plurality of protrusions disposed spacedly on the retaining portion and disposed to abut against one of the annular front contact surface and the annular back contact surface that are adjacent to the retaining portion.

* * * * *